United States Patent
Zeller et al.

(10) Patent No.: US 11,920,033 B2
(45) Date of Patent: Mar. 5, 2024

(54) NON-ISOCYANATE POLYURETHANE FOAM COMPOSITION AND METHOD OF MAKING THE SAME

(71) Applicant: ALGIX, LLC, Meridian, MS (US)

(72) Inventors: Mark Ashton Zeller, Meridian, MS (US); Patrick Lewis Carter, Meridian, MS (US)

(73) Assignee: 62911255, Meridian, MS (US)

( * ) Notice: Subject to any disclaimer, the term of this patent is extended or adjusted under 35 U.S.C. 154(b) by 246 days.

(21) Appl. No.: 17/072,310

(22) Filed: Oct. 16, 2020

(65) Prior Publication Data

US 2021/0261772 A1 Aug. 26, 2021

Related U.S. Application Data (60) Provisional application No. 62/911,255, filed on Oct. 5, 2019.

(51) Int. Cl.
*C08L 75/12* (2006.01)
*C08G 71/04* (2006.01)
(Continued)

(52) U.S. Cl.
CPC .............. *C08L 75/12* (2013.01); *C08G 71/04* (2013.01); *C08J 9/0023* (2013.01); *C08J 9/0066* (2013.01);
(Continued)

(58) Field of Classification Search
CPC ..... C08L 75/12; C08G 71/04; C08G 71/2101; C08G 71/00; C08G 2110/0008;
(Continued)

(56) References Cited

U.S. PATENT DOCUMENTS 8,450,413 B2 5/2013 Diakoumakos et al.
9,487,654 B2 11/2016 Petrovic et al.
(Continued)

FOREIGN PATENT DOCUMENTS

CN 101260232 A * 9/2008
WO WO 2017/085327 5/2017
(Continued)

OTHER PUBLICATIONS

Figovsky, "Synthesis and Application of Nonisocyanate polyurethanes," Chemistry and Chemical Technology, vol. 10, No. 4 (2016), p. 553-559. (Year: 2016).*
(Continued)

*Primary Examiner* — K. Boyle
(74) *Attorney, Agent, or Firm* — Foster Swift Collins & Smith PC; Mikhail Murshak (57) ABSTRACT

A thermoset non-isocyanate polyurethane foam (NIPU) composition includes a reaction product of a polycyclic carbonate, a polyamine; and a foaming ingredient including a carbonate-based chemical foaming agent. The reaction product is configured to form a urethane bond. The polycyclic carbonate and the polyamine can be bio-derived. A process for making the NIPU foam includes the steps of: (a) selecting a polycyclic carbonate and a polyamine; (b) mixing the polycyclic carbonate and the polyamine to form a reactant product including a partially cured gel matrix; (c) adding a foaming ingredient comprising a blowing agent including a carbonate; (d) curing the mixture to form the NIPU foam. Optionally, a first catalyst can be added to step (b); and additional foaming ingredients selected from the group consisting of an accelerant, a surfactant, and a combination thereof can be added prior to step (d).

20 Claims, 4 Drawing Sheets

(51) Int. Cl.
    *C08J 9/00*           (2006.01)
    *C08J 9/08*           (2006.01)
    *C08G 101/00*      (2006.01)

(52) U.S. Cl.
    CPC ............ *C08J 9/08* (2013.01); *C08G 2101/00* (2013.01); *C08J 2203/02* (2013.01); *C08J 2375/12* (2013.01)

(58) Field of Classification Search
    CPC . C08J 9/0023; C08J 9/0066; C08J 9/08; C08J 2203/02; C08J 2375/12
    See application file for complete search history.

(56)                  References Cited

U.S. PATENT DOCUMENTS

| | | | |
|---|---|---|---|
| 2004/0230009 A1* | 11/2004 | Wilkes .................. | C11C 3/00 |
| | | | 525/327.3 |
| 2012/0183694 A1 | 7/2012 | Olang | |
| 2014/0171530 A1 | 6/2014 | Mahon et al. | |
| 2017/0218124 A1 | 8/2017 | Lauth et al. | |

FOREIGN PATENT DOCUMENTS

| | | |
|---|---|---|
| WO | WO 2019/164900 | 8/2019 |
| WO | WO 2021/067976 A1 | 4/2021 |

OTHER PUBLICATIONS

International Search Report, dated Apr. 14, 2022 for PCT/US2020/056089, 19 pages.

\* cited by examiner

NON-ISOCYANATE POLYURETHANE FOAM COMPOSITION AND METHOD OF MAKING THE SAME

CROSS REFERENCE TO RELATED APPLICATION

This application claims priority to and the benefit of U.S. Provisional Patent Application No. 62/911,255 titled "NON-ISOCYANATE POLYURETHANE FOAM COMPOSITION" and filed on Oct. 5, 2019, the disclosure of which is incorporated herein by reference in its entirety for all purposes.

TECHNICAL FIELD

The present disclosure relates generally to the field of polymer foams and end products, particularly polyurethane foams.

DESCRIPTION OF RELATED ART

Interest in producing sustainable material solutions and improving the safety of chemical products has created major changes in many industries. However, polyurethane (PU) chemistry has remained largely unchanged. The use of isocyanates has resulted in severe health hazards with both acute and chronic health implications and are made using phosgene, a highly dangerous and regulated gas. Despite the risk, they remain the predominant chemical used in PU compositions. This is because while isocyanate is very hazardous, it is also very reactive and is capable of quickly forming urethane linkages as well as producing gas when used with water. Isocyanate gas formation reactions and crosslinking reactions both proceed quickly and at a similar rate which allows for easy foam production since the speed of gas expansion is matched to the rate of polymer curing. Since the production of flexible and rigid foams dominates the PU market with a majority of PU profits being targeted at foam compositions, any technology which seeks to replace PU chemistry needs to be able to demonstrate the ability to foam in order to achieve broad market acceptance.

Work on non-isocyanate polyurethane (NIPU) chemistry has focused largely on using reactions between cyclic carbonates and amines to produce hydroxyl-polyurethane compositions with similar properties to conventional PU. However, this technology was previously limited to work in foaming because amines lack reactivity with water which produces a suitable blowing gas and the reaction rates of NIPU reactions was too slow to cure on a time scale which is foamable. The majority of NIPU compositions, thus far, have been targeted at the generation of coatings and other applications where slower reactions are suitable and the hydroxy-polyurethane bonding structure may be useful. While it has been demonstrated that foam using amines with poly(methylhydrogensiloxane) MH-15 to remove hydrogen gas as a blowing agent is possible, the result lacks feasibility on a commercial scale for economic, safety, and material property reasons. The reactions generate hydrogen gas which poses a combustion risk. The MH-15 carries a high cost relative to conventional PU chemistry components. The reaction yields a MH-15 molecule which is heavily cross-linked to amine sites, which is likely to produce unfavorable properties or at least limit the range of characteristic foam properties achievable.

Despite other attempts to solve the problems associated with a forming improved PU foams, none teach or suggest a material and/or method having the benefits and features of the present disclosure.

SUMMARY

The present disclosure provides for a non-isocyanate polyurethane (NIPU) foam. In an example, a thermoset NIPU foam composition is provided that includes a reaction product of: (a) a polycyclic carbonate, having a plurality of cyclic carbonate functional groups, ranging from 5 to 90% of the NIPU foam composition ingredients by weight; (b) a polyamine, having a plurality of amine functional groups, ranging from 5% to 90% of the NIPU foam composition ingredients by weight; and (c) a foaming ingredient configured to produce the NIPU foam composition ranging from 0.5 to 20% of the NIPU composition ingredients by weight. The foaming ingredient includes a carbonate-based chemical blowing agent. The polycyclic carbonate and the polyamine form a urethane bond. The cyclic carbonate functional group and amine functional group can be provided in a ratio in a range from 4:1 to 1:4. In another example, the cyclic carbonate functional group and amine functional group are provided in a ratio in a range from 2:1 to 1:2.

The polycyclic carbonate can be bio-derived and includes a carbonated triacylglycerol (TAG) or a fatty acid methyl ester (FAME) derived from one or more natural oils. In a further example, the polycyclic carbonate includes 15 to 80% of the NIPU foam composition by weight. The polyamine can also be bio-derived compound selected from the group consisting of hexamethylene diamine (NMDA), putrescine, cadaverine, chitosan/chitin, pentamethylene diamine (PMDA), decarboxylated lysine and polylysine. In yet another example, the polyamine includes 15 to 80% of the NIPU foam composition by weight. The resulting NIPU foam material can define a density from 1 to 400 $kg/m^3$ and/or a Shore A hardness from 1 to 80.

The present disclosure further provides for a NIPU foam composition that includes a reaction product of the polycyclic carbonate, polyamine, and foaming ingredient having carbonate along with a catalyst selected from the group consisting of Lewis acids and bases, phosphoric acids, carbines, phosphines, enzymes, guanidines, thioureas, triazabicyclodecene (TBD), phenylcyclohexylthiourea, and combinations thereof. The catalyst can be introduced into the reaction prior to the chemical blowing agent. The carbonate-based chemical blowing agent can be provided in a loading by weight from 0.5% to 20%. The carbonate-based chemical blowing agent includes a carbonate selected from the group consisting of calcium carbonate, ammonium bicarbonate, sodium bicarbonate, potassium bicarbonate, sodium carbonate, calcite, aragonite, dolomite, kutnohorite, ankerite, magnesium carbonate, barium carbonate, potassium carbonate, zinc carbonate, copper carbonate, silver carbonate, carbonates or bicarbonates of group 1 metals, carbonates or bicarbonates of group 2 metals, carbonates of transition metals, and combinations thereof. In an example, the carbonate based chemical blowing agent is selected to produce a byproduct salt configured to confer a desired protective benefit to the NIPU foam composition with the byproduct salt is a salt of a metal selected from the group of metals consisting of copper, zinc, barium, and silver.

The present disclosure still further provides for a NIPU foam composition that includes a reaction product of the polycyclic carbonate, polyamine, and foaming ingredient having carbonate along with an accelerant introduced with the chemical blowing agent, wherein the accelerant includes water and an acid. The accelerant can be provided at a loading range by weight up to 15%.

The present disclosure still further provides for a NIPU foam composition that includes a reaction product of the polycyclic carbonate, polyamine, and foaming ingredient having carbonate along with a surfactant introduced with the chemical blowing agent. The surfactant can include a member selected from the group consisting of a silicone-based surfactant, a stearate, polyethylene glycol, polyethylene oxide, a polyorganic acid, sodium dodecyl sulfate, ethylene oxide, polypropylene oxide, an alkoxylate, propylene glycol, and combinations thereof. The surfactant can be provided at a loading range by weight from 0 to 15%.

The present disclosure still yet provides for a thermoset NIPU foam composition comprising a reaction product of: (a) a bio-derived polycyclic carbonate having a plurality of cyclic carbonate functional groups, a bio-derived polyamine having a plurality of amine functional groups, and a foaming ingredient configured to produce the NIPU foam composition, wherein the foaming ingredient comprises a carbonate-based chemical foaming blowing agent, and wherein the polycyclic carbonate and the polyamine form a urethane bond; (b) a catalyst reacted with the polycyclic carbonate and the polyamine prior to combining with the foaming ingredient; and (c) an accelerant and a surfactant provided as additional foaming ingredients configured to generate the NIPU foam having desired properties. The cyclic carbonate functional group and amine functional group are provided in a ratio in a range from 4:1 to 1:4. The desired properties of the NIPU foam include a density of the NIPU foam from 1 to 400 kg/m3 and a Shore A hardness from 1 to 80.

The present disclosure even further provides for a process for making nonisocyanate polyurethane (NIPU) foam composition including the steps of: (a) selecting a polycyclic carbonate and a polyamine; (b) mixing the polycyclic carbonate and the polyamine to form a reactant product comprising a partially cured gel matrix having urethane bonds; (c) adding a foaming ingredient including a chemical blowing agent including a carbonate; (d) curing the mixture of the reactant product including the partially cured gel matrix and the foaming ingredient to form the NIPU foam; (e) optionally adding a catalyst to step (b); and (f) optionally adding additional foaming ingredients selected from the group consisting of an accelerant, a surfactant, and a combination thereof prior to step (d). The polycyclic carbonate and the polyamine can each be bio-derived and the polycyclic carbonate and polyamine can be provided in a ratio in a range from 4:1 to 1:4.

BRIEF DESCRIPTION OF THE DRAWINGS

The figures which accompany the written portion of this specification illustrate embodiments and method(s) of use for the present disclosure constructed and operative according to the teachings of the present disclosure.

The various embodiments of the present disclosure will hereinafter be described in conjunction with the appended drawings, wherein like designations denote like elements.

DETAILED DESCRIPTION

The present disclosure provides for a non-isocyanate polyurethane (NIPU) foam composition of matter and methods to produce NIPU foam materials. The NIPU foam composition can be formed using a reaction product of a polycyclic carbonate and a polyamine forming a urethane bond combined with a chemical blowing agent. The cyclic carbonate and the amine can be bio-based or bio-derived In an example, the present disclosure provides for NIPU foam compositions and a process of making NIPU foam compositions, which has been demonstrated to be suitable for both flexible and rigid foam applications. In an example of the present disclosure, NIPU chemistry forming hydroxy-polyurethanes involves a reaction product of an amine component, such as a polyamine, and a cyclic carbonate component, such as a polycyclic carbonate, which react to form a hydroxy urethane linkage or bond. When combined with a foaming ingredient a foam is formed. Selecting an appropriate foaming ingredient (also interchangeably referred to as a foaming agent), that includes a blowing agent having a carbonate or bicarbonate, generates the NIPU foam. The cyclic carbonate and the amine component can be bio-derived. A foaming ingredient can be any material that contributes to forming a foam. A blowing agent can be defined as a material that produces gas when combined in a reaction.

The cyclic carbonate or blend of cyclic carbonates may be bio-derived. This includes cyclic carbonated triacylglycerol (TAG) or fatty acid methyl esters (FAME) derived from natural oils such as soy, linseed, algae, flax, teak, fish and other oils. In an example, on average the FAMEs are polyunsaturated. Bio-derived cyclic carbonates may also be drawn from bio-derived polyol or polyol precursors used in conventional PU foaming. These polyols or polyol precursors may have been transesterified with FAME, which has at least one degree of unsaturation on average and can therefore be converted to a cyclic carbonate, or may have been epoxidized and carbonated at their sites of unsaturation. The polycyclic carbonate includes a plurality of cyclic carbonate functional groups. This can aid in the production of materials with similar properties to conventional PU foams since a significant portion of the final foam structure may mirror or resemble conventional PU. Petrochemical cyclic carbonates are also envisioned and suitable for foam production according to the techniques, process steps, and features of the present disclosure.

The selection of a cyclic carbonate can depend on cost, material property targets of the finished NIPU foam, viscosity, and the speed of the reaction rate. Cyclic carbonates can have faster reaction rates if they are not sterically hindered for amine attack which to some extent depends on the selected amine. Further, it has been observed that when aliphatic cyclic carbonates are found to share a neighboring carbon, a "zipper effect" occurs in which the reaction to fully cure occurs more quickly. Often the viscosity of the cyclic carbonate will be higher than the other components and as such lowering the viscosity of the cyclic carbonate as much as possible when selecting your cyclic carbonate will improve foam quality. Using higher viscosity cyclic carbonates may complicate mixing, making cells more likely to coalesce, and increasing the force needed to generate, with the blowing gas, a desired density of foam. In an exemplary embodiment, the viscosity for a polycyclic carbonate or polyamine would be in a range of 500 to 25,000 mPa·s including 1000 to 20,000 mPa·s as well as 1500 to 18,000 mPa·s and 3000 to 15,000 mPa·s. Polycyclic carbonates, which have a plurality of cyclic carbonate functional groups, can be effective since in order to form a crosslinked network the number of crosslinking sites per molecule on average must be 2 or greater with the higher the degree of crosslinking the more rigid the foam is expected to be.

The present disclosure provides for a NIPU foam composition having a cyclic carbonate that makes up 5 to 90% of the composition by weight including 10 to 85% and 15 to 80% or various combinations within these ranges. Cyclic carbonate may be formed by any means and used with the present disclosure; however, they are often produced from a molecule with at least one degree of unsaturation. The carbon-carbon double bond in these molecules is epoxidized and then $CO_2$ is saturated into solution alongside an epoxidized molecule to replace the epoxide ring with a cyclic carbonate ring structure. Sometimes a catalyst such as tetrabutylammonium bromide (TBAB) may be used to stabilize the epoxide ring opening and allow the saturated $CO_2$ to attack and form the cyclic carbonate. Through the use of this process any starting molecule with at least one degree of unsaturation is suitable as a cyclic carbonate source such as the FAMEs described previously.

Amine selection also should consider cost, the material properties of the resulting NIPU foam, and reaction rate with steric hindrance again being a criterion to reduce reaction times to a feasible time scale to produce a desired foam. The amines should be polyaminated (e.g., a polyamine having a plurality of amine functional groups) to form a crosslinked network and preferably will have higher boiling and flash points to reduce the rate of material loss when foaming due to elevated temperatures. Amine selection should consider risk factors associated with user contact since, while they do not generally have the hazards from exposure that isocyanates do, they still carry some exposure risks namely tissue corrosion.

Amines may be bio-derived with commercially available sources existing including hexamethylene diamine (NMDA) and pentamethylene diamine (PMDA). HDMA is used in Nylon 6,6 manufacturing and PMDA is also used in Nylon which contains a five (5) carbon monomer segment such as Nylons (5,6), (5,11) and (5,12). Bio-derived amines can be produced from the decarboxylation of amino acids such as lysine or the formation of polylysines, through the amination of diols in the presence of ammonia, and preparations of chitosan/chitin or glucosamine, as well as through other means. There are also naturally occurring diamines such as putrescine (butanediamine) and cadaverine (pentamethylene diamine).

Polyamines are effective since the number of crosslinking sites per molecule on average must be two (2) or greater with higher crosslinking density yielding more rigid foam properties. According to the present disclosure, amines may make up 5 to 90% of the NIPU foam composition by weight including 10 to 85% and 15 to 80% or various combinations within these ranges.

In addition to cyclic carbonates and amines, an optional catalyst may be used in order to speed up the formation of a gelled polymer matrix and/or a fully cured polymer. Examples of known NIPU catalysts include but are not limited to: Lewis acids and bases, phosphoric acids, carbines, phosphines, enzymes, guanidines, and thioureas. An effective catalyst in terms of increasing reaction rate is generally found to be triazabicyclodecene (TBD) or phenylcyclohexylthiourea. These catalysts may be added during the initial mixing phase of foam production, wherein a gel matrix is being formed or they may be added alongside foaming agents to improve curing speed of the gel matrix during foaming. However, catalysts are not a necessary addition during either step and foaming may be conducted without the use of a catalyst. In an example, the catalyst addition rate typically is between 1.0 and 0.01% of the final composition by weight.

In an example, when combining the polycyclic carbonates with polyamines to form a urethane bond, it is helpful to consider the materials functional equivalent weight (FEW). The FEW helps to determine the appropriate weight of each monomer (polycyclic carbonate and polyamine) that should be used to achieve the desired polymerization characteristics in a NIPU foam composition. The FEW is determined by taking the individual monomer molecular weight and dividing it by the number of functional sites or the degree of functionality per molecule. The FEW then provides a weight typically in g/mol per functional group. In an example, a NIPU foam composition is produced having the starting materials provided in a ratio of cyclic carbonate functional group to amine functional group in a range of 4:1 to 1:4 including 3:1 to 1:3 as well as 2:1 to 1:2, and further 1.5:1 to 1:1.5. In yet another example, the ratio of cyclic carbonate to amine is 1:1.

A greater ratio shifted towards the cyclic carbonate or amine may be required to counteract effects of side reactions or to leave functionality available for reactions after the production of a NIPU foam. Side reactions may be purposeful, such as the route to produce amide linkages described herein or they may be unintentional and/or unavoidable such as amines reacting with $CO_2$ in the presence of water to form carbamates or cyclic carbonates degrading to form epoxides and releasing $CO_2$. The FEW allows intended cyclic carbonate to amine ratios to be achieved by multiplying the ratio for each monomer by the FEW to get the required weight for that monomer. In an example, if the FEW for the polyamine were high and the ratio required for amines is one (1) polycyclic carbonate per four (4) amines, then a high weight of amine (up to 90%) in a final composition could result even though the ratio between the monomers did not exceed 4. Likewise, in the opposite conditions, the weight percentage could be very low (as low as 5%) even though the ratio between monomers did not exceed 4.

To form a desired NIPU foam composition, through chemical foaming, a suitable foaming ingredient is required. Example foaming ingredients may include an accelerant, a surfactant, a blowing agent and/or a combination thereof. The foaming ingredients are generally used in a loading from 0.5% to 20% including 2% to 17.5% and 3% to 15%, or various combinations within these ranges. To produce the NIPU foam, the foaming ingredient includes a blowing agent having a carbonate or a bicarbonate.

The present disclosure provides for use of a carbonate or bicarbonate (collectively "carbonate") as a primary blowing agent for NIPU foam production. Carbonate blowing reactions have several effective characteristics which make them well suited for NIPU foaming. For example, cyclic carbonates can be thermally activated and since heating the reaction mixture during foaming also helps to speed along curing reactions, temperature can be used as a means to control the rate of curing reactions as well as gas generation to maintain balanced reaction rates. The inherent balance of PU foaming reactions is effective in meeting industry demands for the PU foaming markets and carbonate decomposition reactions results in a similar characteristic tunability by utilizing cure temperature. Additionally, carbonates are affordable, abundant, and safe to use. Furthermore, carbonate decomposition can be accelerated in the presence of acids and water giving further reaction tunability and reducing dependence on temperature alone. Carbonates degrade at low enough temperatures that heating the foam mixture excessively, which increases cost and the potential unwanted side reactions that do not yield urethane linkages, is not required.

Examples of suitable carbonates include calcium carbonate, ammonium bicarbonate, sodium bicarbonate, potassium bicarbonate, sodium carbonate, calcite, aragonite, dolomite, kutnohorite, ankerite, magnesium carbonate, barium carbonate, potassium carbonate, zinc carbonate, copper carbonate, silver carbonate, carbonates or bicarbonates of group 1 metals, carbonates or bicarbonates of group 2 metals, carbonates of transition metals, and others. Carbonate decomposition generates $CO_2$ which is a suitable blowing gas for NIPU foam production and depending on the carbonate selected, may also generate meaningful quantities of water and ammonia which may act as a blowing agent depending on foaming temperature or even catalyze further urethane crosslink formation in the case of ammonia. Suitable foaming temperatures range from around 0° C. to 160° C., including 10° C. to 150° C., as well as 20° C. to 140° C.

Carbonates can be selected based on their cost, thermal decomposition temperature, gas contribution, byproduct, salt, and metal salt reaction products, and/or other factors. For instance, a carbonate may be selected to produce a salt or metal salt byproduct that produces a beneficial effect such as mold resistance. In an example, copper (II) carbonate may be used for instance so that as a byproduct of gas formation a copper metal salt can be formed such as copper sulfate. Copper sulfate is a well-known and potent anti-bacterial, anti-fungal, anti-algal and anti-microbial agent, which if properly incorporated into the NIPU foam could allow it to likewise exhibit these protective properties. In certain industries such as the bedding industry or the footwear industry producing PU foam products which are sufficiently protected from mold or fungal growth is a significant challenge. Therefore, carbonate selection could be an important route to confer an even greater benefit to a NIPU foam composition. Other metal salts are also known to contribute similar protective benefits including but not limited to silver, zinc, and barium and carbonate selection could be targeted to achieve an enhanced NIPU foam with protective qualities. The byproducts of the carbonate-based chemical blowing agent can result in $CO_2$, which is released out of the foam, and byproducts, like a salt byproduct that would be incorporated into the structure of the resulting foam. Carbonate loading can range, by weight, depending on foam density targets from 0.5 to 15% loading, including 1 to 12.5% as well as 1.5 to 10% and various combinations within these ranges.

Accelerants as mentioned above include acids and water. Water acts as a solvent and allows acid/carbonate reactions to proceed and the acid is used to quicken carbonate decomposition producing a salt byproduct. Using organic acids, especially polycarboxylic acids, can allow amines to react with the carboxylic acid salts formed to generate amide linkages in the polymer matrix which may allow for improved and/or tailored material properties of a finished foam. Likewise using phosphoric acids and Lewis acids may also allow the acid to serve a dual purpose in both catalyzing curing and accelerating gas formation in the same accelerant. Accelerant loading may range from 0 to 15% loading, including 0.5 to 12.5%, and 1 to 10% and various combinations within these ranges. If using an accelerant, the amount of amine used may need to be adjusted to account for amines lost to amide linkage formation and/or carbamate formation due to reaction with $CO_2$ in the presence of water.

Surfactants aid in emulsifying the water, amine, cyclic carbonate mixture and reducing the surface tension of cells as they form in the foam thereby preventing cell coalescence. There are many types of surfactants commercially available which may be suitable depending on the application and the type of cyclic carbonate, and amines selected. Suitable surfactants include but are not limited to: silicone-based surfactants, stearates, polyethylene glycol, polyethylene oxide, polyorganic acids, sodium dodecyl sulfate, ethylene oxide, polypropylene oxide, alkoxylates, and propylene glycol. Surfactant loading may range by weight from 0 to 15%, including 0.5% to 12.5%, and 1 to 10%, or various combinations within these ranges.

After a mixture of polyamine, polycyclic carbonates, foaming ingredients and catalysts, if desired, is selected, foam production can be achieved following a modified PU foaming technique. In an example, the resultant reaction product is a bio-based NIPU foam composition. The polyamines and polycyclic carbonates can be mixed with or without catalysts in the absence of foaming ingredients to establish a partially cured gel matrix, which is suitable for capturing and holding air bubbles as they are formed. In an example, the time it takes to establish a partially cured gel matrix is from 1 second to about 20 minutes. In another example, this may take 10 seconds to 10 minutes or longer depending on the catalysts (or if a catalyst) is used and the reaction rates of the polyamines and polycyclic carbonates. After the gelling period the material is ready to accept foaming ingredients. Adding foaming ingredients before the polymer has sufficiently gelled may cause the evolution of gases before they are ready to be captured by the polymer allowing more gas escape and less foam expansion. If water and acid accelerants are used it may also lead to a higher rate of carbamate or amide formation with the unreacted amines depending on the acids used which may harm the material properties of a finished product.

After gelling time is complete, one or more foaming ingredients can be added and then mixed briefly before adding to an oven. At least one of the foaming ingredients added is a blowing agent having carbonate. In an example, the adding of the foaming ingredient is for up to 1 minute before adding to an oven. In an example, the mixing can be done with a high shear mixer. Oven temperature settings can be set based on the polymer cure rate and desired gas evolution rate when considering the thermal decomposition temperature of a chosen carbonate. After a sufficient cure time in the oven, a foam will be formed which can be demolded and cured, having a urethane bond between the cyclic carbonate and the amine. Additional curing can take place over the next 24 to 48 hrs, during which the foams final properties will develop. The resulting NIPU foam composition is produced having densities ranging from 1 to 400 kg/m3 including 2 to 350 kg/m3, 5 to 300 kg/m3, 10 to 200 kg/m3 and 15 to 100 kg/m3. Additionally, the resulting NIPU foam is produced having a Shore A hardness in a range from 1 to 80 including 3 to 70 as well as 5 to 60, 8 to 50 and 10 to 40. The present disclosure provides for a method of producing a bio-based NIPU foam composition according to the steps set forth hereinabove.

Figure 1:
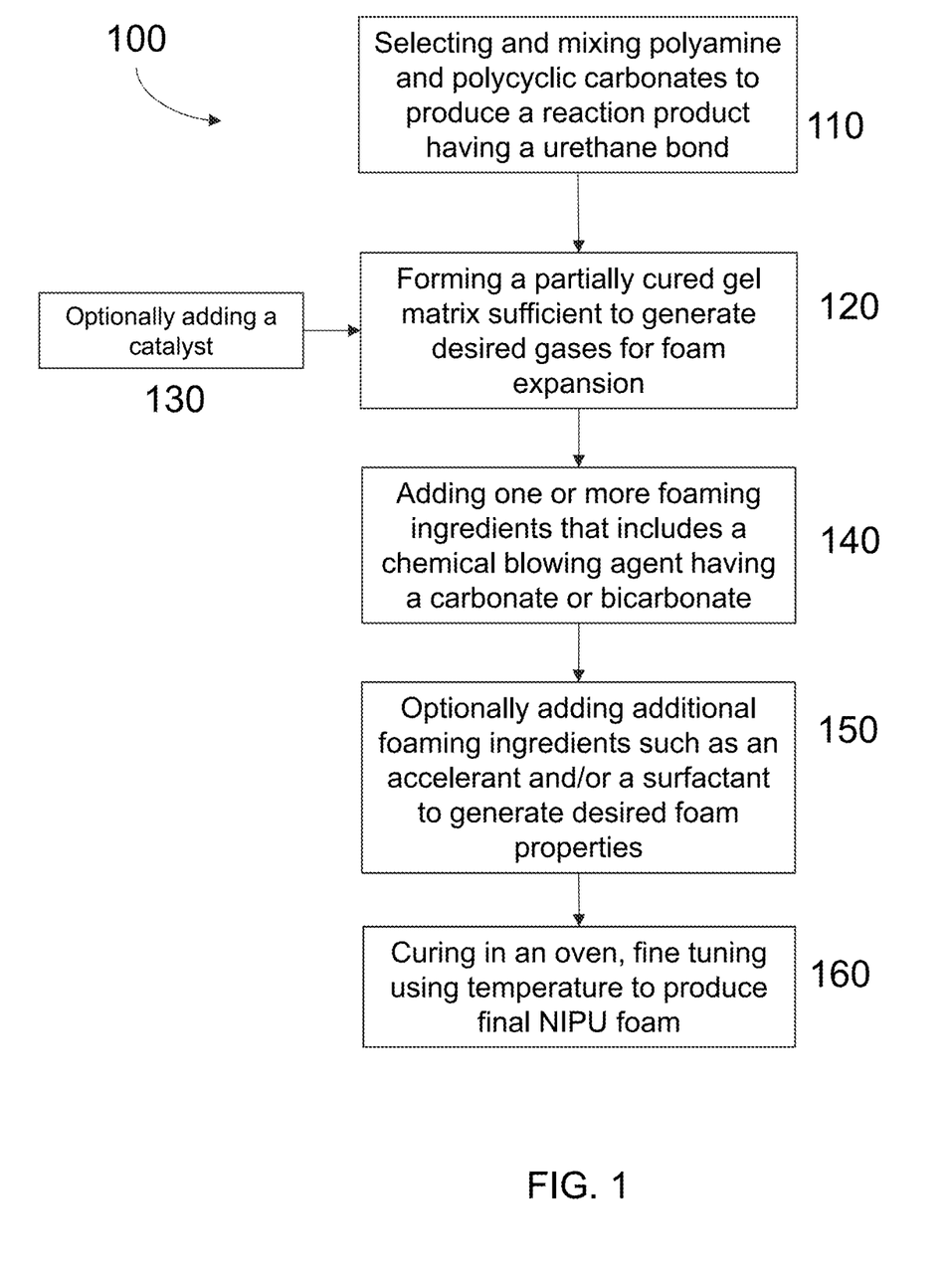
FIG. 1 is a process flow chart of an example polyurethane foam production process according to the present disclosure.

Referring to FIG. 1, an example flow chart of process 100 of making a NIPU foam according to the present disclosure is provided. In this example, the process starts at step 110 where polycyclic carbonates and polyamines are selected to form the desired foam and mixed to form a urethane bond. The starting materials can be bio-based. The mixture is allowed to react and partially cure forming a gel matrix in step 120. A catalyst can optionally be selected in step 130 and added to the mixture to assist with the partial curing and forming of the gel matrix. The gel matrix should be allowed to cure for a time sufficient to produce a desired gas content without letting the gas evolve out of the mixture to ensure an effective foam expansion. Moreover, a FEW ratio of the polycyclic carbonate and amine starting material can be tuned to ensure a desired NIPU foam reaction product. The process continues to step 140 where a foaming ingredient is added. The foaming ingredient includes a chemical blowing agent that includes at least a carbonate (e.g. a carbonate or a bicarbonate). In step 150, additional foaming ingredients such as accelerants, catalysts, and surfactants can optionally be added to generate a PU foam having certain desired properties. In this step, the reaction is tunable based on the amount of those components and the time allowed to react. The process continues to step 160 where it is cured at a desired temperature. This can be done in a suitable oven and for a suitable period of time to generate the resulting NIPU foam. The curing step allows for temperature tuning of the reaction to ensure proper foam expansion and formation.

Figure 2:
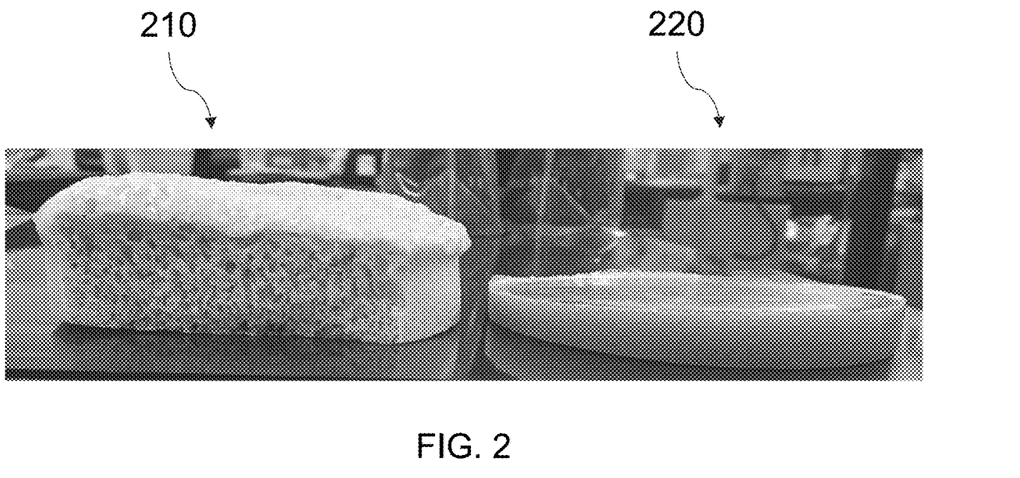
FIG. 2 is a photograph showing a side-by-side cut through of a foamed and an unfoamed NIPU blend.

FIG. 2 is a photograph showing a side-by-side of a foamed NIPU material 210 and an unfoamed NIPU blend materials 220. In this example, the NIPU is composed of cyclic carbonate derived from triacylglycerols from linseed and hexamethylene diamine. Ammonia bicarbonate was used as the blowing agent. A silicone surfactant was used in this sample with the trade name VORASURF and no catalyst was used.

Figure 3:
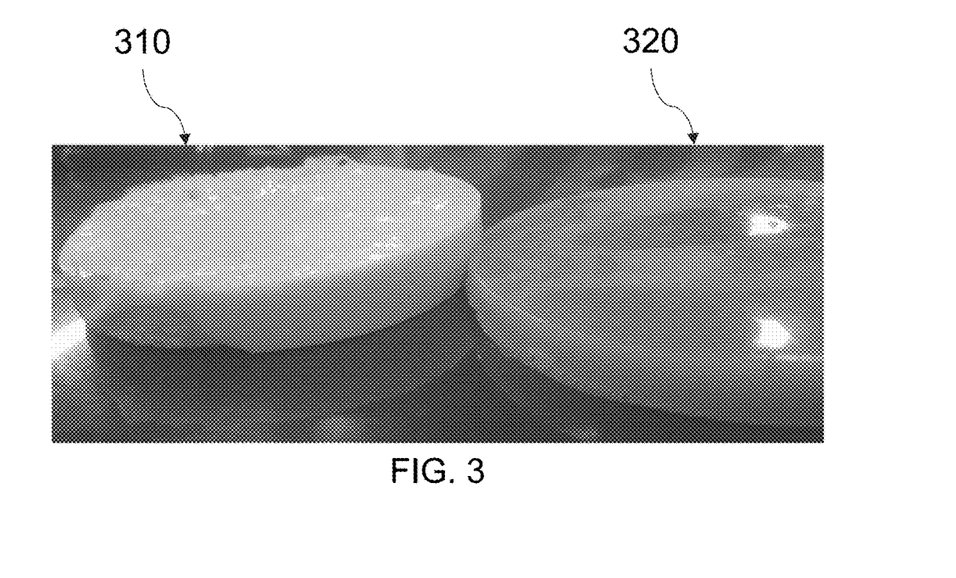
FIG. 3 is a photograph of side-by-side foamed and unfoamed NIPU, uncut, that was produced without catalyst or surfactant and used sodium bicarbonate as a chemical blowing agent along with the same cyclic carbonate and amine used in the examples of FIG. 2.

FIG. 3 is an example photograph of side-by-side of a foamed NIPU material 310 and an unfoamed NIPU blend material 320. In this example, the NIPU was formed using no catalyst or surfactant. Sodium bicarbonate was provided as the chemical blowing agent rather than ammonia bicarbonate, but had the same cyclic carbonate and amine of FIG. 2. These samples are shown without a cut into its cross-section so that the interior foam structure is not visible. These photographs illustrate a clear difference in size, density and hardness when a foam is compared to an unfoamed counterpart.

Figure 4:
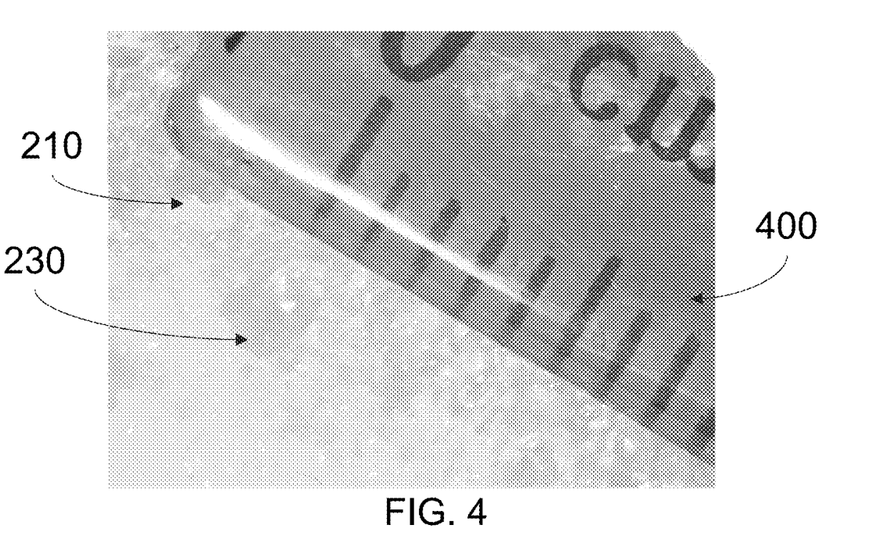
FIG. 4 is a first microscope photo taken at 10X zoom of the NIPU foam of FIG. 2.
Figure 5:
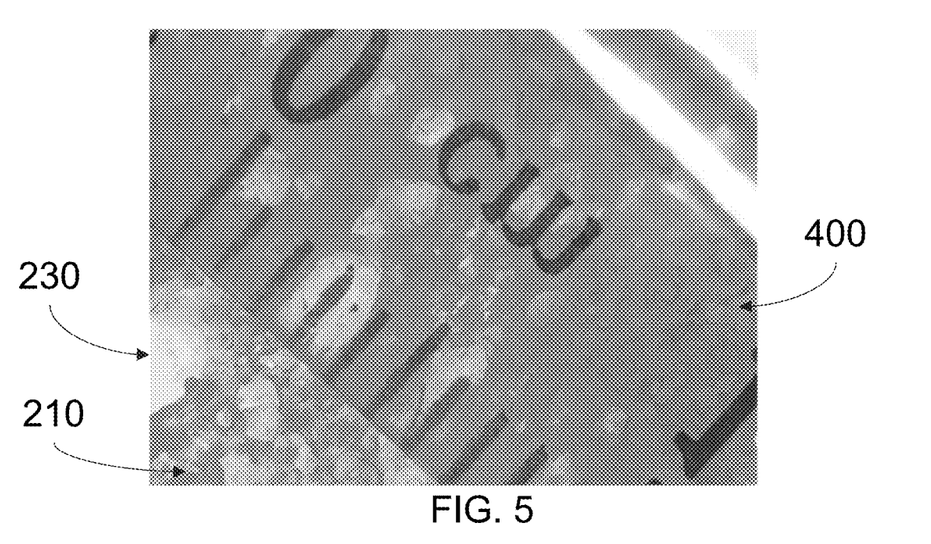
FIG. 5 is a second microscope photo taken at 10X zoom of the NIPU foam of FIG. 2.
Figure 6:
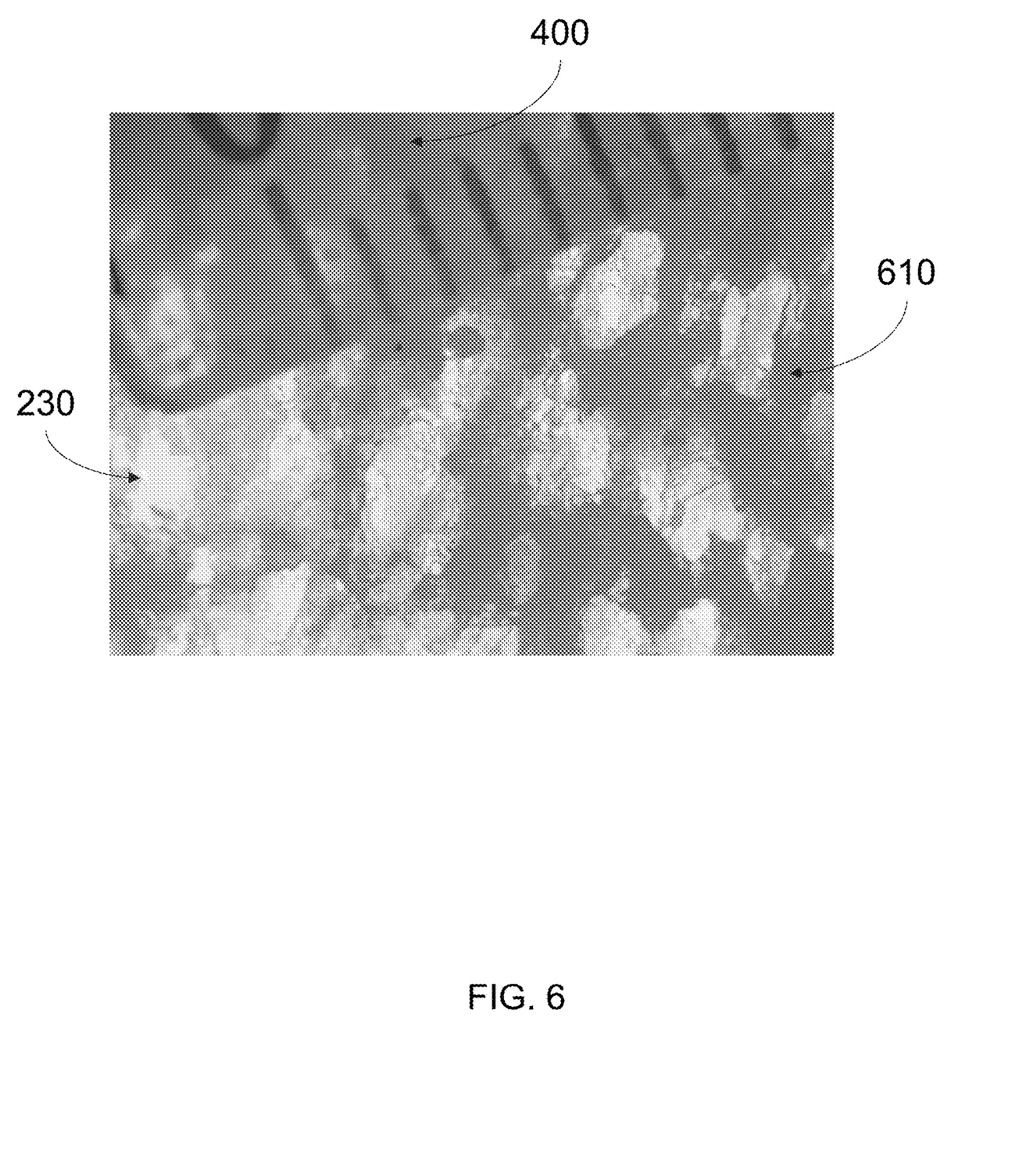
FIG. 6 a microscope phots taken at 10X zoom of a NIPU foam with no surfactant and with triazobicyclodecene as a catalyst.

FIGS. 4-5 are microscope photos taken at 10× zoom of a NIPU foam of FIG. 2. FIG. 6 is a microscope photo taken at 10× zoom of a NIPU foam with no surfactant and with triazobicyclodecene as a catalyst.

NIPU foams are suitable for commercially viable end products of all variations including but not limited to: memory foams, sporting goods, shoe components, automotive goods, insulation, industrial applications, and the like.

EXAMPLES

Carbonated Linseed Oil (CLO) obtained had an average molecular weight of 1128 g/mol and a functional equivalent weight (FEW) of 222.3 g/mol. Hexamethylene diamine (NMDA) was obtained from SIGMA ALDRICH with a molecular weight of 116.21 g/mol and a FEW of 58.1 g/mol. Foaming agents included citric acid powder and ammonium bicarbonate. A reaction catalyst triazabicyclodecene (TBD) was obtained from AK SCIENTIFIC. A cell stabilizer Vorasurf DC 5951 was obtained from DOW CHEMICAL.

Two experiments were performed. One included the silicone surfactant Vorasurf DC 5951 and one did not. Material was prepared according to a 100 g polyurethane batch size. See Table 1 for batch formula:

TABLE 1

| NIPU formulation | |
|---|---|
| Ingredient | Grams (g) |
| Carbonated linseed oil (CLO) | 79.3 |
| Hexamethylene diamine (HMDA) | 20.7 |
| Citric Acid | 2.67 |
| Ammonium Bicarbonate | 5.78 |
| Triazabicyclodecene (TBD) | 0.3 |
| DI Water | 3.34 |
| Vorasurf 5951* | 0.5 |

CLO and HMDA were pre-heated to 60° C. in a convection oven in preparation for foaming reaction. Next, the dry ingredients including 2.67 g of citric acid, 3.3 g of ammonium bicarbonate, and 0.3 g of TBD were weighed into separate weigh boats. Weighing out dry ingredients was done just before conducting the reaction to prevent excessive moisture uptake from the environment in the citric acid. Additionally, before retrieving the pre-heated CLO and HMDA, 3.34 ml of DI water was measured out into a graduated cylinder. Next, 79.3 g of CLO were poured into a 400 mL beaker while still warm. The small amount 0.3 g of TBD catalyst was added to the CLO and mixed vigorously for a few seconds using a high shear mixing implement attached to a drill. Next 20.7 g of HMDA was weight out into a separate glass beaker while melted and quickly added to the CLO beaker to prevent the HMDA from crystallizing on the glassware before it is poured. The high shear mixture was used to stir the HMDA into the CLO vigorously for about 2 minutes moving the mixer up and down in the mixture and scrapping the beaker walls to ensure a good mix. Then, the remaining dry ingredients were added slowly with the citric acid being added before the ammonium bicarbonate. If the Vorasurf DC 5951 was included, it was added immediately following the dry ingredients by pipette.

Once the mixture was evenly mixed (between about 30 seconds to 1 minute), the DI water was added to the mixture and stirred in for a few more seconds (e.g., less than about 10 seconds). After mixing in the water, the mixture immediately began to produce air bubbles as the acid and carbonate reacted. The mixture was then poured swiftly into a silicon mold and then immediately placed into a convection oven pre-heated to 80° C. The mixture was left to cure for at least 15 minutes before it was removed from heat and cooled. After cooling to room temperature or near room temperature the NIPU foam was removed from the silicon mold. The samples were initially very soft and springy to the touch with a very slow rebound characteristic. However, after 24 hours, the foam became much stiffer and after several weeks developed into a very stiff polymer with a significant resistance to compression or deformation. In the optimal expression of this formula, the TAG-rich CLO would be replaced with a carbonated FAME mixture with the average fatty acid degree of unsaturation being slightly over 2. This could make the formula easier to mix and more likely to produce small, well distributed, and consistent cells in the foam and would likely result in a more flexible foam.

Additionally, an experiment was conducted using deacetylated chitin as the amine source in the hydroxy polyurethane bond. The same CLO from the experiment above was used, but the partially deacetylated (75%) chitin was sourced from SIGMA ALDRICH. The experiment was conducted with a 20 g batch size targeted. See table 2 for batch formula:

TABLE 2

| | |
|---|---|
| 75% Deacetylated Chitin | 10 g |
| Carbonated linseed oil (CLO) | 10 g |
| 95% Ethanol | 50 ml |
| 5% Acetic Acid solution | 5 ml |
| DI Water | 100 ml |
| Sodium Bicarbonate | 1.156 g |

Because the CLO was still in the form of a triacylglycerol rich oil, it was too viscous to be mixed with chitin directly. Accordingly, the CLO was dissolved in 50 ml of ethanol at 80° C. Then the CLO solution was left to cool. Next, chitin was mixed with water and acetic acid to make chemically available (decrystalized) chitin polymers and amine groups. It was mixed until a creamy gel was formed from the chitin powder. Then the CLO-ethanol mix was added to the chitin gel and was mixed with a high shear mixer for about 2 minutes. After the mixture was well mixed, it was poured into a mold and the sodium bicarbonate was added. The sodium bicarbonate should be mixed-in while adding and should only be mixed for a few seconds. With the addition of the sodium bicarbonate, the mixture quickly turned into a hydrogel. The hydrogel was added to an oven at 80° C. for 24 hours to cure. After 24 hrs the hydrogel was desiccated and polyurethane had cured leaving behind a foam.

It should be noted that the steps described in the method of use can be carried out in many different orders according to user preference. The use of "step of" should not be interpreted as "step for", in the claims herein and is not intended to invoke the provisions of 35 U.S.C. § 112 (f). Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the disclosure described herein are exemplary and numerous modifications, variations and rearrangements can be readily envisioned to achieve substantially equivalent results, all of which are intended to be embraced within the spirit and scope of the disclosure. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. A thermoset non-isocyanate polyurethane (NIPU) foam composition comprising:
   a reaction product of:
   (a) a polycyclic carbonate, having a plurality of cyclic carbonate functional groups, ranging from 5% to 90% of the NIPU foam composition by weight;
   (b) a polyamine, having a plurality of amine functional groups, ranging from 5% to 90% of the NIPU foam composition by weight; and
   (c) a foaming ingredient configured to produce the NIPU foam composition, the foaming ingredient ranging from 0.5 to 20% of the NIPU foam composition by weight, wherein the foaming ingredient comprises a carbonate-based chemical blowing agent,
   wherein the carbonate-based chemical blowing agent decomposes, and the decomposition is accelerated in the presence of acids and water,
   wherein the NIPU foam composition has a Shore A hardness from 1 to 80,
   wherein the polycyclic carbonate and the polyamine form a urethane bond; and
   wherein characteristics of the NIPU foam composition are tunable by changing cure temperature and acid composition.

2. The NIPU foam composition of claim 1, wherein the plurality of cyclic carbonate functional groups and the plurality of amine functional groups are provided in a functional equivalent weight (FEW) ratio in a range from 4:1 to 1:4.

3. The NIPU foam composition of claim 1, wherein the plurality of cyclic carbonate functional groups and the plurality of amine functional groups are provided in a functional equivalent weight (FEW) ratio in a range from 2:1 to 1:2.

4. The NIPU foam composition of claim 1, wherein the polycyclic carbonate is bio-derived and includes a carbonated triacylglycerol (TAG) or a carbonated fatty acid methyl ester (FAME) derived from one or more natural oils.

5. The NIPU foam composition of claim 1, wherein the polycyclic carbonate comprises 15 to 80% of the NIPU foam composition by weight.

6. The NIPU foam composition of claim 1, wherein the polyamine is a bio-derived compound selected from the group consisting of hexamethylene diamine (HMDA), putrescine, cadaverine, chitosan/chitin, pentamethylene diamine (PMDA), decarboxylated lysine and polylysine.

7. The NIPU foam composition of claim 1, wherein the polyamine comprises 15 to 80% of the NIPU foam composition by weight.

8. The NIPU foam composition of claim 1, wherein the reaction product further comprises (d) a catalyst, and the catalyst is selected from the group consisting of Lewis acids and bases, phosphoric acids, carbines, phosphines, enzymes, guanidines, thioureas, triazabicyclodecene (TBD), phenylcyclohexylthiourea, and combinations thereof.

9. The NIPU foam composition of claim 1, wherein the carbonate-based chemical blowing agent is provided with a thermal decomposition temperature from 0 to 160° C.

10. The NIPU foam composition of claim 1, wherein the carbonate-based chemical blowing agent includes a carbonate selected from the group consisting of calcium carbonate, ammonium bicarbonate, sodium bicarbonate, potassium bicarbonate, sodium carbonate, calcite, aragonite, dolomite, kutnohorite, ankerite, magnesium carbonate, barium carbonate, potassium carbonate, zinc carbonate, copper carbonate, silver carbonate, carbonates or bicarbonates of group 1 metals, carbonates or bicarbonates of group 2 metals, carbonates of transition metals, and combinations thereof.

11. The NIPU foam composition of claim 10 wherein the carbonate-based chemical blowing agent is selected to produce a byproduct salt configured to confer a desired protective benefit to the NIPU foam composition with the byproduct salt is a salt of a metal selected from the group of metals consisting of copper, zinc, barium, and silver.

12. The NIPU foam composition of claim 1, wherein the presence of acids and water to accelerate the decomposition of the carbonate-based chemical blowing agent is provided at a loading range by weight up to 15%.

13. The NIPU foam composition of claim 1, wherein the reaction product further includes a surfactant introduced with the carbonate-based chemical blowing agent, wherein the surfactant includes a member selected from the group consisting of a silicone-based surfactant, a stearate, polyethylene glycol, polyethylene oxide, a polyorganic acid, sodium dodecyl sulfate, ethylene oxide, polypropylene oxide, an alkoxylate, propylene glycol, and combinations thereof.

14. The NIPU foam composition of claim 13, wherein the surfactant is provided at a loading range by weight up to 15%.

15. The NIPU foam composition of claim 1, wherein the polycyclic carbonate or polyamine has a viscosity in a range of 500 to 25,000 mPa·s.

16. A thermoset non-isocyanate polyurethane (NIPU) foam composition comprising a reaction product of:
(a) a reaction product of a bio-derived polycyclic carbonate having a plurality of cyclic carbonate functional groups, a bio-derived polyamine having a plurality of amine functional groups, and a foaming ingredient configured to produce the NIPU foam composition, wherein the reaction product includes the presence of acids and water and is cured at a temperature and wherein the foaming ingredient comprises a carbonate-based chemical foaming blowing agent that decomposes in the presence of the acids and water and the decomposition is accelerated in the presence of the acids and water, and wherein the polycyclic carbonate and the polyamine form a urethane bond and characteristics of the reaction product are tunable by changing cure temperature and acid composition;
(b) a catalyst reacted with the polycyclic carbonate and the polyamine prior to combining with the foaming ingredient;
(c) an accelerant and a surfactant provided as additional foaming ingredients configured to generate the NIPU foam having desired properties;
wherein the plurality of cyclic carbonate functional group and the plurality of amine functional group are provided in a ratio in a range from 4:1 to 1:4, and
wherein the desired properties of the NIPU foam include a density of the NIPU foam from 1 to 400 kg/m$^3$ and a Shore A hardness from 1 to 80.

17. The thermoset non-isocyanate polyurethane (NIPU) foam composition of claim 16, wherein either the bio-derived polycyclic carbonate or the bio-derived polyamine has a viscosity in a range of 500 to 25,000 mPa·s.

18. A process for making non-isocyanate polyurethane (NIPU) foam composition comprising the steps of:
(a) selecting a polycyclic carbonate and a polyamine;
(b) mixing the polycyclic carbonate and the polyamine to form a reactant product comprising a partially cured gel matrix having urethane bonds;
(c) adding a foaming ingredient comprising a chemical blowing agent including a carbonate that decomposes in the presence of an acids and water and the decomposition is accelerated in the presence of acids and water;
(d) curing the the reactant product comprising the partially cured gel matrix and the foaming ingredient to form the NIPU foam, wherein characteristics of the NIPU foam are tunable by changing cure temperature and acid composition;
(e) optionally adding a catalyst to step (b); and
(f) optionally adding additional foaming ingredients selected from the group consisting of an accelerant, a surfactant, and a combination thereof prior to step (d);
wherein the resulting NIPU foam has a Shore A hardness from 1 to 80.

19. The process of claim 18, wherein the polycyclic carbonate and the polyamine are each bio-derived and the polycyclic carbonate and polyamine are provided in a ratio in a range from 4:1 to 1:4.

20. The process for making non-isocyanate polyurethane (NIPU) foam composition of claim 18, wherein either the polycyclic carbonate or the polyamine has a viscosity in a range of 500 to 25,000 mPa·s.

* * * * *